United States Patent

Würtz et al.

[11] Patent Number: 5,865,273
[45] Date of Patent: Feb. 2, 1999

[54] METHOD OF PREPARING AND DISTRIBUTING PORTIONED MEALS, PREFERABLY FOR USE IN AIR TRANSPORT

[75] Inventors: Thomas Würtz, Amsterdam, Netherlands; Knud Høst-Madsen, Hellerup, Denmark

[73] Assignee: Gate Gourmet International AG, Zurich, Switzerland

[21] Appl. No.: 765,545
[22] PCT Filed: Jul. 10, 1995
[86] PCT No.: PCT/DK95/00299
  § 371 Date: Mar. 27, 1997
  § 102(e) Date: Mar. 27, 1997
[87] PCT Pub. No.: WO96/01584
  PCT Pub. Date: Jan. 25, 1996

[30] Foreign Application Priority Data

Jul. 11, 1994 [DK] Denmark .................. 0836/94

[51] Int. Cl.⁶ .................................................. B64D 11/00
[52] U.S. Cl. .......................... 186/40; 244/118.5; 134/72; 134/126
[58] Field of Search ................... 186/40, 44; 244/118.5; 134/25.2, 71, 72, 73, 126, 159; 211/41.8, 41.9

[56] References Cited

U.S. PATENT DOCUMENTS

| | | | |
|---|---|---|---|
| 2,750,611 | 6/1956 | Chatel | 134/72 X |
| 3,517,899 | 6/1970 | Vernon | 244/118.5 X |
| 3,960,290 | 6/1976 | Yake et al. | 220/338 |
| 5,086,544 | 2/1992 | Huttemann et al. | 211/41.8 |
| 5,201,826 | 4/1993 | Zimmermann | 211/41.9 |

FOREIGN PATENT DOCUMENTS

| | | |
|---|---|---|
| 2 128 282 | 10/1972 | France . |
| 1 403 654 | 10/1968 | Germany . |
| 43 39 111 | 5/1994 | Germany . |
| WO 89/04136 | 5/1989 | WIPO . |

OTHER PUBLICATIONS

Database PTS New Product Announcements on Dialog, PR Newswire, Eastern Airlines, (Atlanta, GA, USA), No. 0207327, "Eastern Airlines dedicates new Atlanta flight Kitchen", Dec. 14, 1988.

*Primary Examiner*—F. J. Bartuska
*Attorney, Agent, or Firm*—Finnegan, Henderson, Farabow, Garrett & Dunner. L.L.P.

[57] ABSTRACT

When making meals ready for air transport, soiled service and cutlery (24), when arriving in an airport, are sorted, cover-divided in baskets, for use for the next flight. The soiled service is sent into an industrial dishwasher, following which it is provided with food and packed in carts. Large amounts of storage space are saved in this manner in the individual airports, since the cycle time for storage of service and cutlery can be reduced from 26 hours to about 2 hours.

6 Claims, 5 Drawing Sheets

METHOD OF PREPARING AND DISTRIBUTING PORTIONED MEALS, PREFERABLY FOR USE IN AIR TRANSPORT

BACKGROUND OF THE INVENTION

The invention concerns a method of preparing and distributing portioned meals, preferably for use in air transport.

The invention moreover concerns a basket for use in the performance of the method and a cutlery holder for use in the basket.

As will be known, much transport today takes place by air. In connection with air transport, a meal is usually served, which may be composed rather differently according to which airline is in charge of the transport. Generally, however, some form of food is served on the vast majority of flights.

With the many daily flights it is huge amounts of meals that have to be prepared. It is therefore quite natural to try to rationalize all cycles of operations in connection with the preparation of air meals.

FIG. 1 shows a typical sequence in the preparation of meals in connection with flights. As will be seen in FIG. 1, a kitchen for cold dishes and a kitchen for hot dishes receive food products from external suppliers. When the food has been prepared, the meals are made ready, i.e. served on trays, including e.g. saucers, glasses, cups, cutlery, etc. When the meals have been-made ready, they are placed in a trolley, hereinafter called a cart throughout this specification. The cart is driven out to the aircraft, and following departure the meals are served to the passengers. Before the aircraft lands, all service and cutlery are collected and again placed on a cart. Then the soiled service and cutlery are moved to an industrial dishwasher in which they are washed. After washing, service and cutlery are placed in a store, so the entire procedure can be repeated again. As will be appreciated, a store is required in each air kitchen, and this store must be so large as to constantly have enough service and cutlery available for subsequent flights. Cutlery, service, cups and glasses are stored in the individual air kitchens in such a manner that the store is divided according to each type of service for each individual airline. Further, it is not unusual for stores to have to be provided with a capacity of covering the needs for service and cutlery for about 26 hours, which is the cycle time from arrival to departure of service, and with the many daily flights it will be appreciated that air kitchens must have very large stores of service and cutlery.

Accordingly, the object of the invention is to provide a method of preparing and distributing portioned meals which saves storage space.

SUMMARY OF THE INVENTION

This object is achieved by a method of the type defined comprising the steps of:

a) receiving raw materials from suppliers
b) preparing meals in portioned units which are placed in service,
c) making service and cutlery ready on trays
d) packing meal units in carts
e) transporting carts to aircraft
f) packing the soiled service in carts after the passengers of the aircraft have consumed the meals
g) transporting the soiled service back from the aircraft, removing service and cutlery from the carts and passing them on for washing-up in a dishwasher.

This method is characterized by h) sorting the soiled service and cutlery immediately upon removal from the carts into such units as correspond to the requirement for ready and clean service, and
i) directly passing the soiled service to the dishwasher, and then
j) repeating steps a–g.

When the method is performed in this manner, a very great storage space saving is obtained, since instead of a store for 26 hours, a store for about 2 hours now suffices, said 2 hours being the cycle time from arrival to departure.

In an advantageous embodiment of the method, a minor buffer store for the completion of service and cutlery is provided in step h).

This provides the advantage that where some service has disappeared for one reason or another during transport, it is possible to supplement with new cutlery from the buffer store. Further the buffer store is also advantageous, if other meals than those just arrived with the last aircraft have to be served.

Additionally, the method is advantageous in that the soiled service, cutlery and trays are placed in baskets, which are adapted to receive at least a complete set of soiled service with cutlery and tray.

This provides an extremely well-arranged cycle of operations, since trays, cutlery and service, when leaving the dishwasher, can be handled and made ready very quickly.

In an embodiment, the method is also advantageous in that, between steps i) and j), cutlery is packed in bags in cover units, or that the cutlery is packed by rolling-up in a napkin and is put back in the baskets.

Additionally, the method is advantageous in that, after wrapping of cutlery, service, cutlery and trays are removed from the baskets, and a napkin as well as cutlery, cups, glasses, salt and pepper and the like are placed on the tray, while the units to be provided with food are collected in other baskets and are passed to a central location to be filled with food, and then the units provided with food are returned to the trays, which are then placed in carts.

This provides a very flexible organization of the work, it being noted that within a period of 2 hours from the arrival of the soiled service with the aircraft it is made ready on carts, after washing, and is ready for the flight. Finally, the method is advantageous in that the preparation and distribution of the portioned meals are performed by means of several parallel dishwashers.

When several parallel dishwashers are used, the work may be organized such that each parallel dishwasher serves a few, e.g. three to seven, airlines. This is a help to the operators, because the number of different tray accessories to be managed is then reduced.

As mentioned, the invention also concerns a basket for use in the performance of the method. This basket is characterized in that the basket is divided into compartments, which correspond precisely to the reception of the contents of service to be washed from preferably one, max. two baskets.

The basket gives a clear cycle of operations for the staff, since service, cutlery and trays, already when leaving the dishwasher, are divided into portioned units with the things that are to be present on the next flight.

The basket is advantageously equipped with a lid that partly covers it.

This is an advantage in connection with the washing-up, since cups, which are usually used in aircraft, are light cups of plastics which do not turn while the machine washes.

Finally, it is advantageous that the bottom of basket is constructed for conveyance on conveyor belts.

Finally, the invention also concerns a cutlery holder for use in the basket. This cutlery holder is characterized in that it is constructed as a ramp having at least two elevations, one of which terminates the ramp and merges into a horizontal member.

This cutlery-holder is extremely expedient in connection with ready-making on a conveyor belt, where many baskets are to be filled and emptied, since the cutlery holder ensures rapid removal and positioning of cutlery from and in the baskets.

BRIEF DESCRIPTION OF THE DRAWINGS

The invention will be explained more fully now in connection with an embodiment of the invention as shown in the drawing, in which.

DETAILED DESCRIPTION OF THE INVENTION

Figure 1:
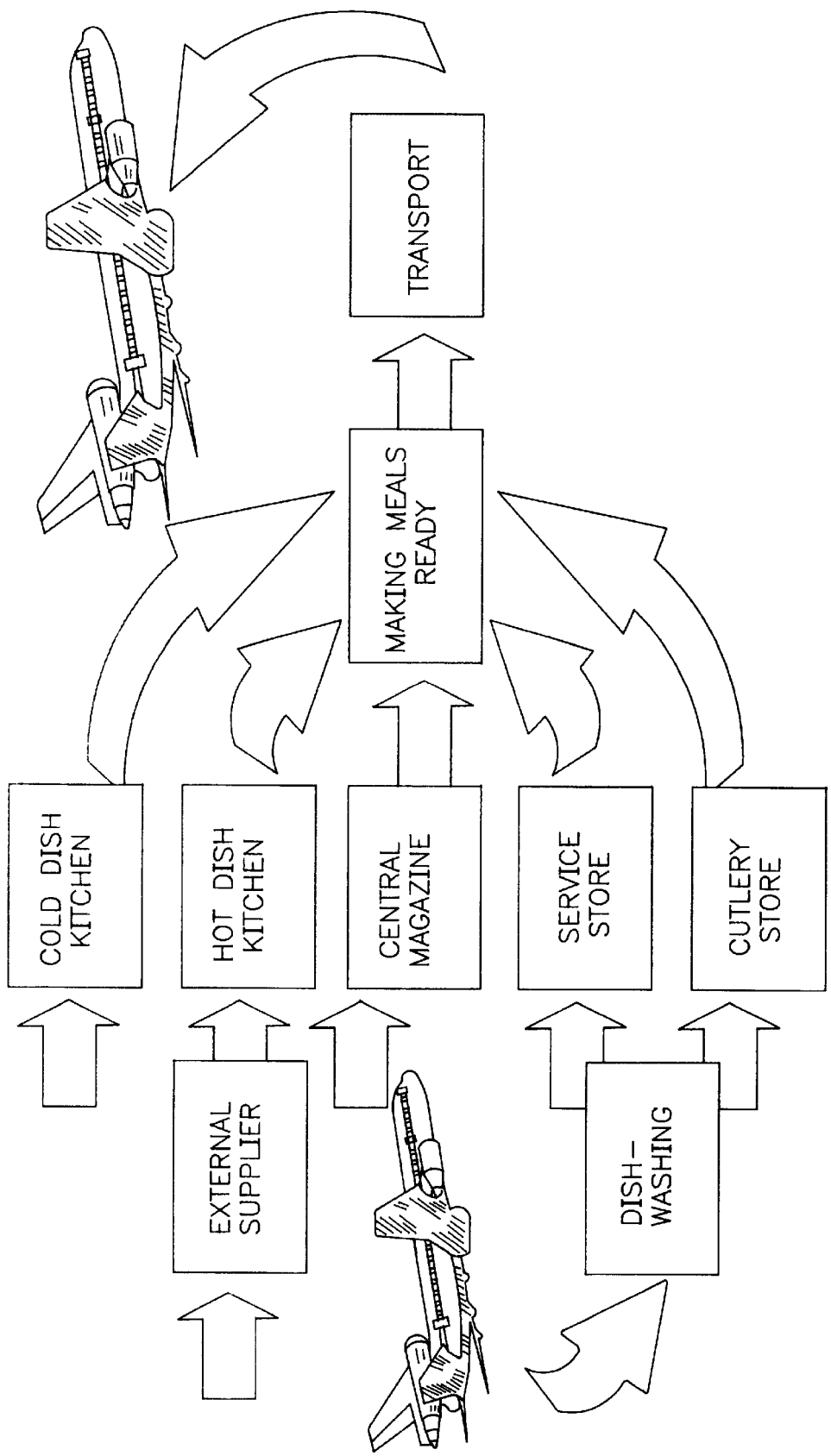
FIG. 1 shows a flow diagram of a known manner of preparing and distributing portioned meals, as already mentioned in the foregoing.
Figure 2:
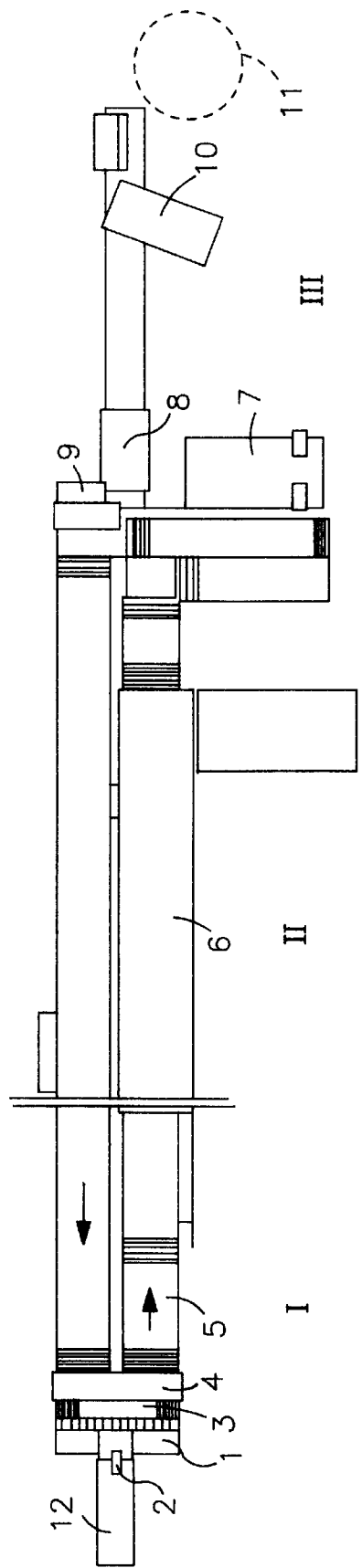
FIG. 2 is an explanatory view of a dishwasher, with the various routines associated with it.

FIG. 2 shows the lay-out of a kitchen for use when making meals ready. The kitchen is divided into three areas, where area I is the area where soiled service is received and sorted, area II is the actual dishwasher, and area III is the area where washed service is made ready. In area I, the soiled service from a flight is received in carts (i.e. trolleys) and is sorted in a special basket, which will be described in connection with FIG. 4. Waste is discarded into a hole 2 near the sorting location 1. A buffer store 4 is provided at the sorting location 1, and this buffer store is used for completing and/or supplementing the cover units that are to be made now of soiled service. The buffer store is arranged such that it has precisely the units that are to be used for the next flight. If the next flight is to have another composition of meals, the buffer store is provided with sufficient cutlery for this. The buffer store moreover has the advantage that it is now possible to check the amount of waste that might have occurred at the last flight. This is easily done, it being merely observed how much of the service from the buffer store is used in the making of the new covers. The waste can thus be measured merely by counting the buffer store before and after use. When the soiled service has been divided into portions, it is conveyed by a conveyor belt 5 into the area II, where it is washed up in a dishwasher 6. After washing-up, which takes place in a modified industrial dishwasher, the cleaned service arrives at the area III, the baskets arriving at an area 7 where the cleaned cutlery is wrapped in plastics sheet or placed on a napkin. The ready cutlery is put back where it came from in the basket, following which the basket is transported to the next area where service and cutlery are removed from the basket in such a manner that the service to be provided with food is placed in larger trays and is transported to a kitchen for cold dishes or a kitchen for hot dishes. The rest of the service, such as cutlery, cups, glasses, salt and pepper, etc., made ready on a tray, is conveyed on a conveyor belt further on to the location 10 where the saucers and bowls filled with food are put back on the tray. The ready trays are then packed in carts 11 and are now ready for the next flight. As will be appreciated, the transport of service and cutlery takes place on a belt provided with baskets that circulate in an endless path, the baskets being at no time removed from the belt that runs in the directions of the arrows shown in FIG. 3.

Figure 3:
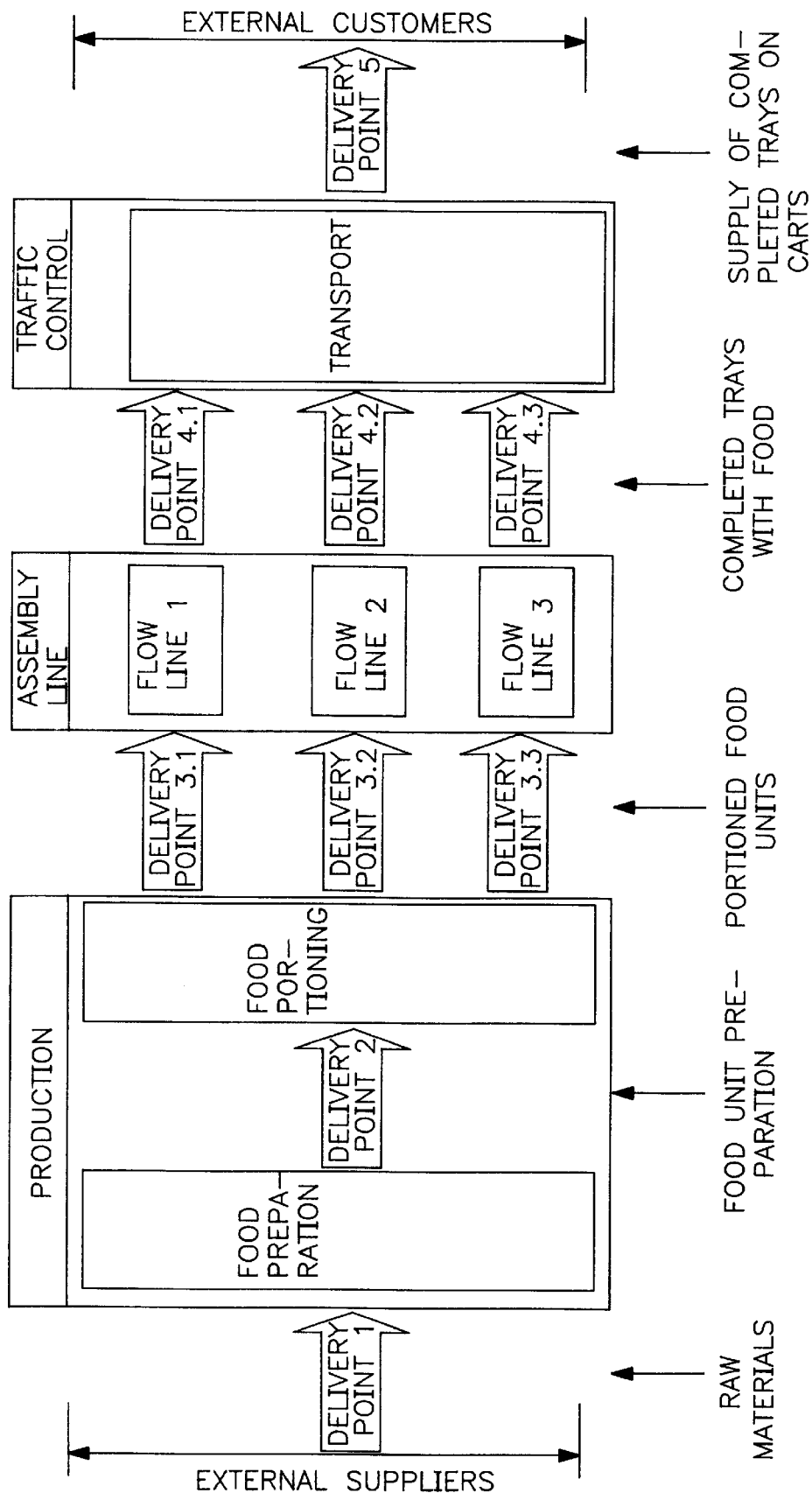
FIG. 3 is a flow diagram of a complete system for preparing and distributing portioned meals according to the invention.

FIG. 3 shows a flow diagram of the process in the ready-making of portioned meals according to the invention. It will be seen to the left in FIG. 3 that raw materials are supplied by external suppliers, said raw materials being transported to a production department where the food is prepared and portioned. FIG. 3 shows an assembly line consisting of three flow lines. These three flow lines separately correspond to the one shown in FIG. 2. The three flow lines are constructed in the same manner and can each handle typically from three to seven different airlines. Thus, the assembly line shown in FIG. 3 can typically serve up to 21 different airlines. The advantage of dividing it into several units is that the staff then just have to be attentive to the requirements of seven airlines with respect to the laying of trays. This minimizes possible errors, and simultaneously the smaller units have the effect on the staff operating the assembly line that they constitute a team who are jointly responsible for the operation proceeding as smoothly as possible. After the trays have been made ready, and they have been packed in carts, they are transported out to the external customers which are the various airlines. When the flight is over, the process is repeated, and when it is performed as described, the service just arrived at an airport can be sent off within a time interval of just 2 hours.

Figure 4:
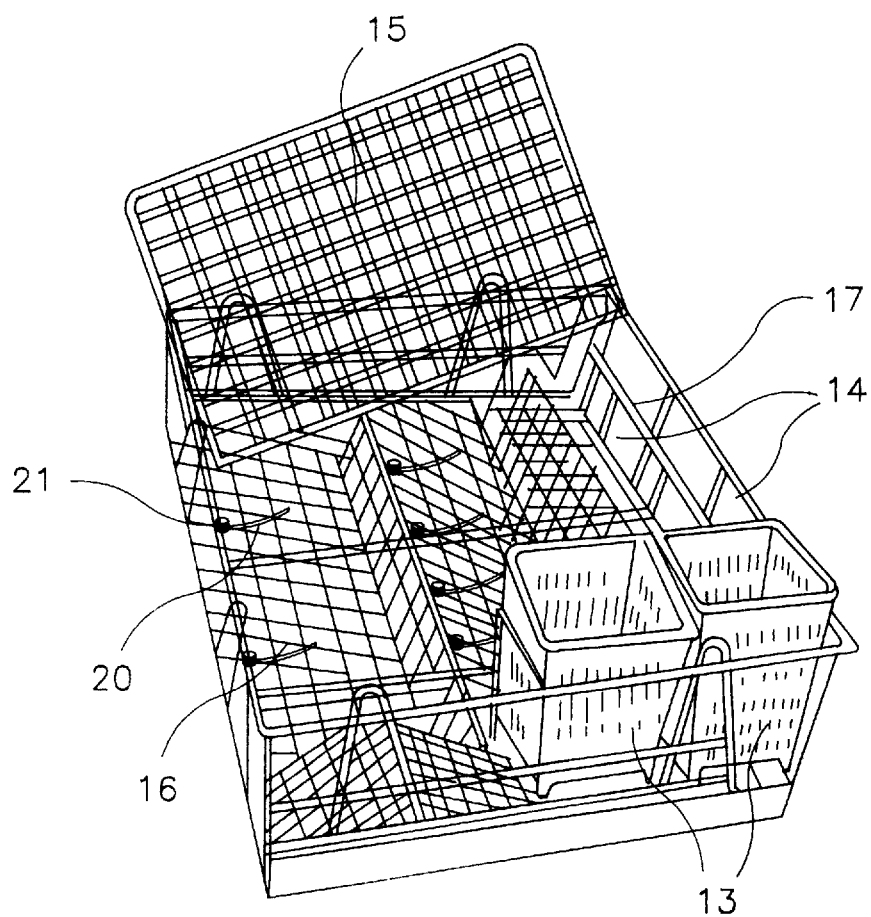
FIG. 4 shows a basket for use in the performance of the invention.

FIG. 4 shows a basket which is extremely expedient for use on the line of FIG. 2. The figure shows that the basket has two insertable cutlery baskets 13 and two elongate compartments 14 for trays and some centrally located compartments 16 to receive saucers, glasses and cups. FIG. 4 additionally shows a lid 15 which may be placed over part of the tray. This is an advantage in particular concerning cups and glasses that are used in aircraft, since they are ordinarily of a light material, such as plastics, and are therefore generally susceptible to the washing jets of the dishwasher. In other words, the cups and the glasses might turn during the washing process, which, of course, is not desirable since a further buffer store then has to be provided at the exit of the dishwasher. The lid 15 can thus retain the cups and the glasses in the correct positions during the entire washing sequence. As an alternative to the lid 15, holding means in the form of pins 20 may be provided in the basket itself, said pins being capable of pivoting about the pivot 21. When light cups are placed in the basket, the pins hold the cups, which then to do not topple about in the basket during washing.

Figure 5:
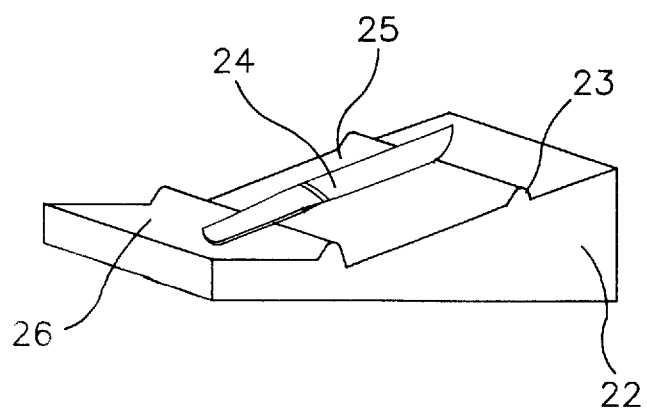
FIG. 5 shows a cutlery holder for use in the basket of FIG. 4.

FIG. 5 shows a cutlery holder 22 which may be used instead of the cutlery basket 13. As will be seen from FIG. 5, it is constructed as a ramp 25 having two elevations 23, one of which terminates the ramp and merges into a horizontal member 26. When the cutlery 24 is placed on the elevations 23, it will be effectively washed on all faces in a dishwasher.

As will be seen, the basket in FIG. 4 is designed for precisely two covers. This is extremely advantageous, since the basket then lends itself for e.g. the serving of both luxurious meals, e.g. on long first class flights, and more modest meals on short flights, as the basket may then be used as a cover for first class preparation, while the basket may contain two covers for somewhat shorter flights where the requirements with respect to the meals and thus the amount of service are not so great.

Figure 6:
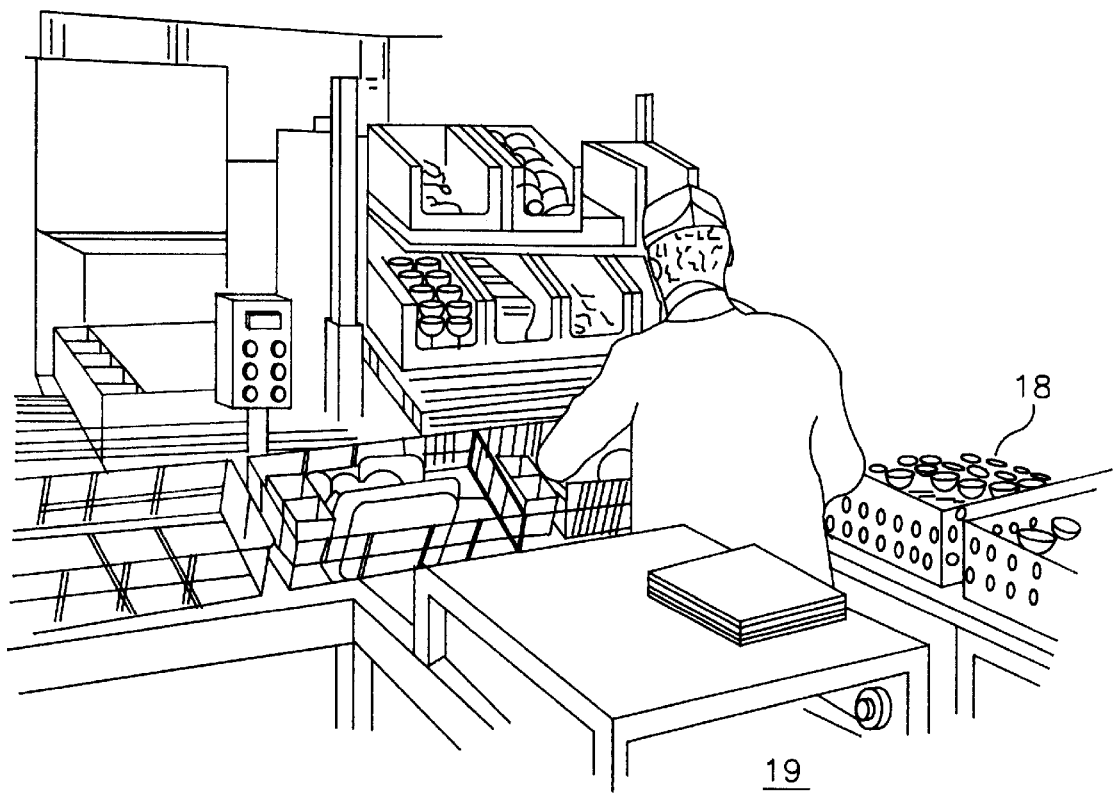
FIG. 6 shows how the baskets on a production line are packed.

Finally, FIG. 6 shows part of the air kitchen according to the invention. A section is shown at a location where the cutlery has been made ready, and where saucers are sorted in bigger baskets 18 for conveyance to a cold dish kitchen or a hot dish kitchen to be filled with food. The rest of the contents of the basket, such as glasses, cups, salt, pepper and a cloth on a tray, is conveyed by a conveyor belt 19 further on to a receiving station where the saucers now filled are again placed on the tray, following which everything is placed in carts and is ready to be sent with the next flight.

We claim:

1. A method for preparing and distributing portioned meals on aircraft, comprising the steps of:
   a) receiving raw materials from suppliers;
   b) preparing means in portioned units from said raw materials;
   c) making clean service units and clean cutlery units ready on trays;
   d) placing the meal units on the trays and packing the trays in carts;
   e) transporting the carts to aircraft;
   f) packing soiled service and cutlery in carts after passengers of the aircraft have consumed the meal units;
   g) transporting the carts containing the soiled service and cutlery away from the aircraft and removing the soiled service and cutlery from the carts;
   h) sorting the soiled service and cutlery immediately upon removal form the carts into at least soiled service units which correspond to said clean service units;
   i) directly passing the units of soiled service to the dishwasher; and
   j) repeating steps a–g).

2. The method of claim 1, wherein the soiled service and cutlery are sorted into soiled service units and soiled cutlery units in step h) which correspond to said clean service units and said clean cutlery units and passing both said soiled units to the dishwasher in step i).

3. The method of claim 2, including providing a buffer store in step h) for completing, if necessary, the soiled service and cutlery units.

4. The method of claim 2, including placing the soiled service units, soiled cutlery units and trays in baskets which are adapted to receive at least one complete set of a soiled service unit, a soiled cutlery unit, and a tray.

5. The method of claim 4, wherein between steps i) and j), clean cutlery units are removed from the baskets, wrapped in cover units, and returned to the baskets.

6. The method of claim 5, including removing clean service units, clean cutlery units, and the trays from the baskets after wrapping of the cutlery units, passing the clean service units to be provided with food to a central location to be filled with food, placing on the tray a napkin, a wrapped cutlery unit, cups, glasses, salt and pepper, returning the service units filled with food to the trays, and then packing the trays in the carts.

* * * * *